(12) United States Patent
Zhang

(10) Patent No.: US 10,768,753 B2
(45) Date of Patent: Sep. 8, 2020

(54) TOUCH DISPLAY PANEL, DISPLAY DEVICE AND TOUCH PANEL

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventor: Jie Zhang, Beijing (CN)

(73) Assignees: BOE TECHNOLOGY GROUP CO., LTD., Beijing (CN); ORDOS YUANSHENG OPTOELECTRONICS CO., LTD., Ordos (CN)

(*) Notice: Subject to any disclaimer, the term of this patent is extended or adjusted under 35 U.S.C. 154(b) by 300 days.

(21) Appl. No.: 15/750,643

(22) PCT Filed: Jun. 30, 2017

(86) PCT No.: PCT/CN2017/091110
§ 371 (c)(1),
(2) Date: Feb. 6, 2018

(87) PCT Pub. No.: WO2018/099069
PCT Pub. Date: Jun. 7, 2018

(65) Prior Publication Data
US 2020/0081565 A1 Mar. 12, 2020

(30) Foreign Application Priority Data

Dec. 1, 2016 (CN) .................... 2016 2 1312804 U

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ....................................................... G06F 3/044
See application file for complete search history.

(56) References Cited

U.S. PATENT DOCUMENTS 8,970,537 B1    3/2015  Shepelev et al.
2011/0157061 A1  6/2011  Kao et al.
(Continued)

FOREIGN PATENT DOCUMENTS

CN    104216564 A    12/2014
CN    104216584 A    12/2014
(Continued)

OTHER PUBLICATIONS

Machine translation of CN105759525A publication of original Jul. 13, 2016 (Year: 2016).*
(Continued)

*Primary Examiner* — Gustavo Polo

(57) ABSTRACT

A touch display panel, a display device and a touch panel are provided, the touch display panel includes a plurality of block touch electrodes spaced apart from each other and a conductive shielding layer, the shielding layer is insulated from the touch electrodes; and an orthographic projection of the shielding layer on the base substrate in the touch display panel is at least in a gap between orthographic projections of the touch electrodes on the base substrate.

14 Claims, 5 Drawing Sheets

(56) References Cited

U.S. PATENT DOCUMENTS

| | | | |
|---|---|---|---|
| 2012/0044178 A1* | 2/2012 | Song | G02F 1/136204 345/173 |
| 2012/0120011 A1 | 5/2012 | Teng et al. | |
| 2012/0326992 A1 | 12/2012 | Yeh | |
| 2015/0109543 A1 | 4/2015 | Lee | |
| 2015/0160754 A1 | 6/2015 | Wenzel | |
| 2016/0048241 A1* | 2/2016 | Zhao | G06F 3/0412 345/174 |

FOREIGN PATENT DOCUMENTS

| | | |
|---|---|---|
| CN | 105759525 A | 7/2016 |
| CN | 206209685 U | 5/2017 |

OTHER PUBLICATIONS

International Search Report and Written Opinion dated Oct. 11, 2017; PCT/CN2017/091110.
European Search Report Application No. PCT/CN2017091110; dated May 5, 2020.

* cited by examiner

TOUCH DISPLAY PANEL, DISPLAY DEVICE AND TOUCH PANEL

TECHNICAL FIELD

Embodiments of the present disclosure relate to a touch display panel, a display device and a touch panel.

BACKGROUND

Projected capacitive touch panels not only have the advantage of simple and convenient operation, but also have advantages such as high penetration, high durability, high waterproof and dustproof property, and the like. Therefore, the projected capacitive touch panels are widely used in public information query, business affairs, industrial control, military command, video games and other fields.

According to detection principles, the projected capacitive touch panels include two types: self-capacitance panels and mutual-capacitance panels. In the self-capacitance panels, touch electrodes are usually arranged in rows and columns, and a touch position of a finger of a user is determined according to the capacitances obtained by scanning the rows of the touch electrodes and the columns of the touch electrodes. In the mutual-capacitance panels, sensing electrodes and driving electrodes are intersected with each other (for example, the sensing electrodes and the driving electrodes are perpendicular to each other), and a capacitance is obtained at an intersection of one row (or one column) of the sensing electrodes and one column (or one row) of the driving electrodes which cooperate with each other, to determine a touch position.

Compared with the mutual capacitance panels, the touch performance of the self-capacitance panels is easily affected by low capacitance uniformity.

SUMMARY

Embodiments of the present disclosure provide a touch display panel, a display device and a touch panel. The embodiments of the present disclosure improve the capacitance uniformity of a self-capacitance panel.

In an aspect, at least one embodiment of the present disclosure provides a touch display panel which includes a plurality of block touch electrodes spaced apart from each other and a conductive shielding layer which is insulated from the touch electrodes; and an orthographic projection of the shielding layer on a base substrate in the touch display panel is at least in a gap between orthographic projections of the touch electrodes on the base substrate.

For example, a material of the shielding layer is a transparent conductive material.

For example, a material of the shielding layer is an opaque conductive material; and the touch display panel further includes a black matrix, and the orthographic projection of the shielding layer on the base substrate overlaps an orthographic projection of the black matrix on the base substrate.

For example, the touch display panel includes an array substrate and an opposite substrate; and the touch electrodes are in the array substrate or the opposite substrate.

For example, the shielding layer is at a side, away from the array substrate, of the opposite substrate; and an entirety of the orthographic projection of the shielding layer on the base substrate is in the gap between the orthographic projections of the touch electrodes on the base substrate.

For example, the shielding layer is at a side, away from the opposite substrate, of the array substrate; and an entirety of the orthographic projection of the shielding layer on the base substrate is in the gap between the orthographic projections of the touch electrodes on the base substrate, or the shielding layer spreads to cover an entirety of a surface, away from the opposite substrate, of the array substrate.

For example, the shielding layer is in the array substrate; and an entirety of the orthographic projection of the shielding layer on the base substrate is in the gap between the orthographic projections of the touch electrodes on the base substrate.

For example, the shielding layer is in the opposite substrate; and an entirety of the orthographic projection of the shielding layer on the base substrate is in the gap between the orthographic projections of the touch electrodes on the base substrate.

For example, the touch electrodes are self-capacitance electrodes.

For example, the orthographic projection of the shielding layer on the base substrate partially overlaps the orthographic projections of the touch electrodes on the bse substrate.

For example, a width of a region where the orthographic projection of the shielding layer on the base substrate overlaps the orthographic projections of the touch electrodes on the base substrate is smaller than 50 micrometers.

In another aspect, at least one embodiment of the present disclosure provides a display device which includes the touch display panel according to any one of the above embodiments, and a circuit board; the shielding layer is connected with a control circuit of the circuit board; and the control circuit is configured to: control the shielding layer to be grounded during a display period, and apply a control signal to the shielding layer during a touch period, to avoid an interference signal except a touch signal.

For example, in the touch period, the control signal applied by the control circuit to the shielding layer is identical to the touch signal.

At least one embodiment of the present disclosure provides a touch panel which includes: a base substrate; a plurality of block touch electrodes which are spaced apart from each other on the base substrate and are self-capacitance electrodes; and a conductive shielding layer on the base substrate. The shielding layer is insulated from the touch electrodes, and an orthographic projection of the shielding layer on the base substrate is at least in a gap between orthographic projections of the touch electrodes on the base substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

01—array substrate; 02—opposite substrate; 10—touch electrodes; 20—shielding layer; 21—black matrix; 201—first shielding layer; 202—second shielding layer; 90—base substrate.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
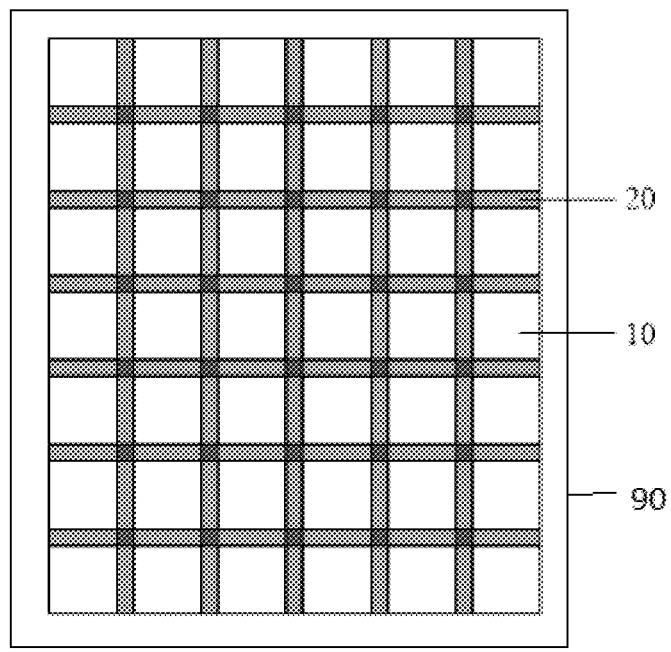
FIG. 1 is a first schematic top view of a touch display panel according to embodiments of the present disclosure.
Figure 2:
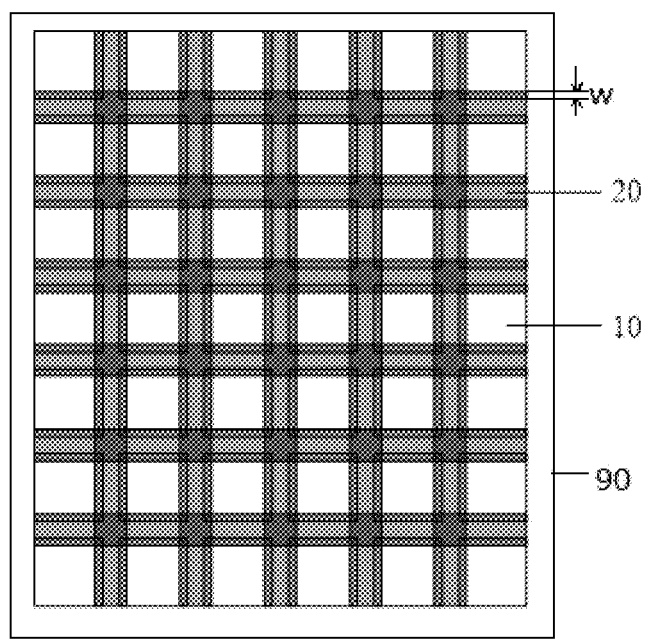
FIG. 2 is a second schematic top view of the touch panel according to the embodiments of the present disclosure.

Embodiments of the present disclosure provide a touch display device. As illustrated in FIG. 1 and FIG. 2, the touch display panel includes a plurality of block touch electrodes 10 spaced apart from each other and further includes a conductive shielding layer 20 which is insulated from the touch electrodes 10, and an orthographic projection of the shielding layer 20 on a base substrate 90 in the touch display panel is at least in a gap between orthographic projections of the touch electrodes 10 on the base substrate 90. For example, a planar shape (that is, a plan view shape) of the conductive shielding layer 20 is a mesh shape.

It should be noted that, firstly, a position of the shielding layer 20 relative to the touch electrodes 10 in a direction perpendicular to a main surface of the base substrate 90 is not limited. The shielding layer 20 is above or below the touch electrodes 10, or the shielding layer 20 and the touch electrodes 10 are in a same layer.

Secondly, the touch display panel includes a display panel which at least includes one base substrate. In a situation that more than one base substrate is included in the touch display panel, only one base substrate serves as the base substrate for the orthographic projections of the touch electrodes 10 and the orthographic projection of the shielding layer 20, that is, the above base substrate 90.

The base substrate is a transparent substrate of any type such as a glass substrate, a plastic substrate, or a quartz substrate.

Thirdly, those skilled in the art should understand that the touch display panel determines a touch position according to the capacitance between a touch object (for example, a finger of a user) and the touch electrodes 10 (that is, the touch electrodes 10 are self-capacitance electrodes); and in a situation that the shielding layer 20 is located above the touch electrodes 10, that is, in a situation that the touch electrodes 10 are located between the shielding layer 20 and the base substrate 90 in the direction perpendicular to the base substrate 90, namely the shielding layer 20 is located at a touch side of the touch electrodes 10, the touch position is unable to be determined via the touch electrodes 10 if the shielding layer 20 covers the entire touch electrodes 10. Therefore, the orthographic projection of the shielding layer 20 on the base substrate is at least located in the gap between the orthographic projections of the touch electrodes 10 on the base substrate 90.

In the case that the shielding layer 20 is below the touch electrodes 10, the shielding layer 20 does not affect the determination of the touch position via the touch electrodes 10 even if the shielding layer 20 overlaps the entire touch electrodes 10. Therefore, in addition to that the orthographic projection of the shielding layer 20 on the base substrate 90 is located in the gap between the orthographic projections of the touch electrodes 10 on the base substrate 90, it is possible that the orthographic projection of the shielding layer 20 on the base substrate 90 covers at least a part of the touch electrodes 10. That is, the orthographic projection of the shielding layer 20 on the base substrate 90 is at least in the gap between the orthographic projections of the touch electrodes 10 on the base substrate 90.

Fourthly, in the case that the orthographic projection of the shielding layer 20 on the base substrate 90 is at least located in the gap between the orthographic projections of the touch electrodes 10 on the base substrate 90, for example, as illustrated in FIG. 1, the shielding layer 20 does not overlap the touch electrodes 10; or for example, as illustrated in FIG. 2, the shielding layer 20 partially overlaps the touch electrodes 10, in which case, considering a width of the shielding layer 20 and in order not to affect the touch control, a width w of a region where the shielding layer 20 overlaps the touch electrodes 10 is, for example, smaller than 50 μm.

For example, in the case that the shielding layer 20 and the touch electrodes 10 are disposed in the same layer (that is, the layer includes the shielding layer 20 and the touch electrodes 10), the shielding layer 20 does not overlap the touch electrodes 10 in order to ensure the insulation therebetween.

In the touch display panel provided in the embodiments of the present disclosure, by providing the shielding layer 20 in the touch display panel and arranging the orthographic projection of the shielding layer 20 on the base substrate 90 in the touch display panel to be at least in the gap between the orthographic projections of the touch electrodes 10 on the base substrate 90 according to the position of the shielding layer 20 relative to the touch electrodes 10, the influence of the shielding layer 20 on the touch control function is avoided. For example, the shielding layer 20 is configured to be applied with a signal (for example, the signal is identical to a signal applied to the touch electrodes 10) during a touch period and be ground during a display period. By applying the signal to the shielding layer 20 during the touch period, the shielding layer 20 is able to prevent the internal signal interference caused by circuit wires at the array substrate of the display panel, the structure arrangement of the touch display panel and the like, or prevent external signal interference, thus the capacitance uniformity of the touch display panel is improved and the touch accuracy is increased. On this basis, by controlling the shielding layer 20 to be grounded in the display period, the antistatic ability of the touch display panel is also improved.

For example, a material of the shielding layer 20 is a transparent conductive material. In this way, there is no need to consider whether the shielding layer 20 blocks light emitted by the touch display panel for displaying, and therefore, the aperture ratio is not affected.

The transparent conductive material is, for example, a transparent conductive metal oxide such as indium tin oxide (ITO) or indium tin oxide (IZO).

Figure 11:
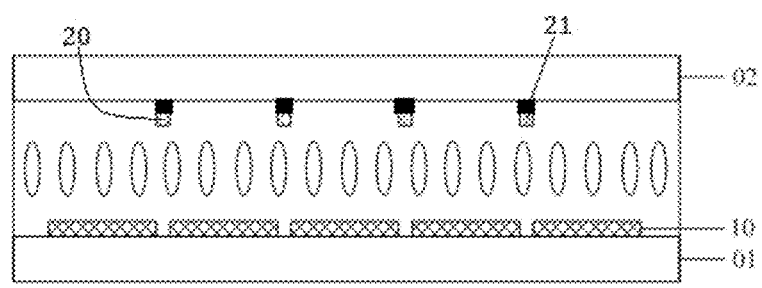
FIG. 11 is a tenth schematic cross-sectional view of the touch panel according to the embodiments of the present disclosure.

For example, the material of the shielding layer 20 is an opaque conductive material. In this case, as illustrated in FIG. 11, the touch display panel further includes a black matrix 21, and the orthographic projection of the shielding layer 20 on the base substrate 90 overlaps an orthographic projection of the black matrix 21 on the base substrate 90. For example, the orthographic projection of the shielding layer 20 on the base substrate 90 is located within the orthographic projection of the black matrix 21 on the base substrate.

For example, the opaque conductive material is at least one or more metal materials selected from the group consisting of molybdenum (Mo), molybdenum alloy, aluminum (Al), aluminum alloy and copper (Cu).

In the embodiments of the present disclosure, the influence on the aperture ratio of the touch display panel is avoided by making the opaque shielding layer 20 correspond to the black matrix.

Figure 3:
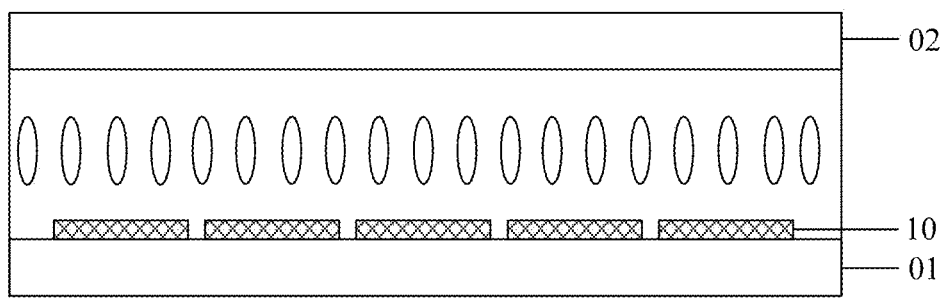
FIG. 3 is a first schematic cross-sectional view of the touch panel according to the embodiments of the present disclosure.
Figure 4:
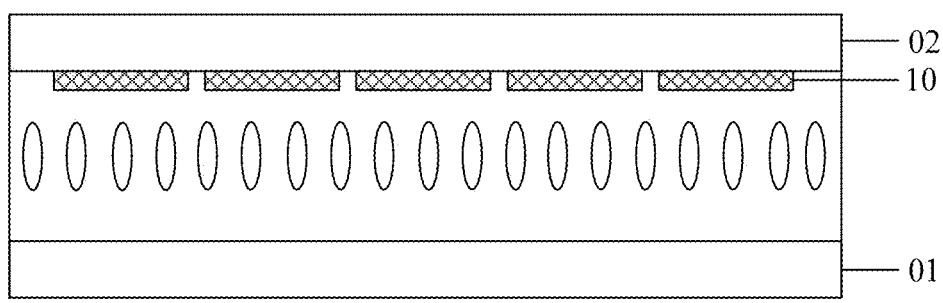
FIG. 4 is a second schematic cross-sectional view of the touch panel according to the embodiments of the present disclosure.
Figure 5:
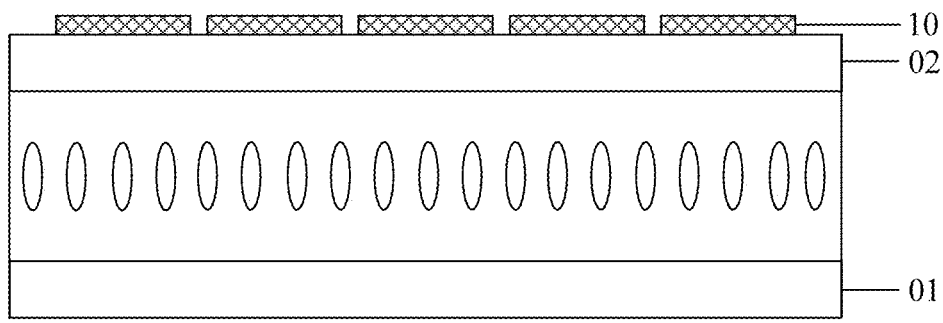
FIG. 5 is a third schematic cross-sectional view of the touch panel according to the embodiments of the present disclosure.

For example, as illustrated in FIG. 3, FIG. 4 and FIG. 5, the touch display panel includes an array substrate 01 and an opposite substrate 02, and the array substrate 01 and the opposite substrate 02 are located in the display panel; and the touch electrodes 10 are in the array substrate 01 or the opposite substrate 02 (that is, the array substrate 01 or the opposite substrate 02 includes the touch electrodes 10).

For example, the touch electrodes 10 are arranged in an in-cell touch mode, that is, the touch electrodes 10 are disposed at a side, facing the opposite substrate 02, of the array substrate 01 as illustrated in FIG. 3, or are disposed at a side, facing the array substrate 01, of the opposite substrate 02 as illustrated in FIG. 4. Or, as illustrated in FIG. 5, the touch electrodes 10 are disposed in an on-cell touch mode, that is, the touch electrodes 10 are disposed at a side, away from the array substrate 01, of the opposite substrate 02. For example, the touch electrodes 10 are between the opposite substrate 02 and an upper polarizer (not shown in the figure) included in the touch display panel.

For example, the array substrate 01 includes a thin film transistor and a pixel electrode electrically connected with a drain electrode of the thin film transistor, and further includes a common electrode. For example, the opposite substrate 02 is a transparent substrate or the opposite substrate 02 includes a black matrix and a color filter layer. For example, the common electrode is disposed in the array substrate 01 or in the opposite substrate 02; and the color filter layer is disposed in the opposite substrate 02 or is disposed in the array substrate 01.

It should be noted that the embodiments of the present disclosure do not limit the arrangement position of the shielding layer 20 in the direction perpendicular to the main surface of the base substrate 90 as long as the shielding layer 20 does not affect the determination of the touch position by the touch electrodes 10.

In addition, each of the array substrate 01 and the opposite substrate 02 includes a base substrate, and thus it is possible to make one of the base substrates serve as a reference for the orthographic projections of the touch electrodes 10 and the orthographic projection of the shielding layer 20, that is, serving as the base substrate 90.

In the embodiments of the present disclosure, the touch electrodes 10 and the display panel are integrated together to make the touch display panel thinner and lighter.

Figure 6:
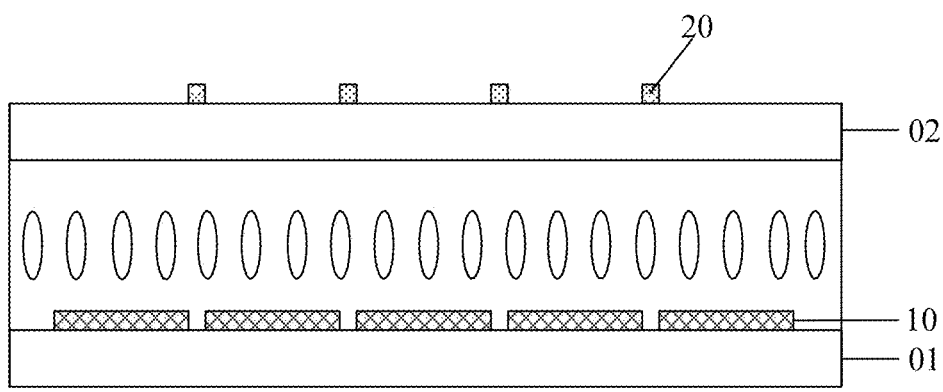
FIG. 6 is a fourth schematic cross-sectional view of the touch panel according to the embodiments of the present disclosure.

For example, as illustrated in FIG. 6, the shielding layer 20 is at the side of the opposite substrate 02 away from the array substrate 01, and the orthographic projection of the shielding layer 20 on the base substrate 90 is located in the gap between the orthographic projections of the touch electrodes 10 on the base substrate. For example, an entirety of the orthographic projection of the shielding layer 20 is located in the gap between the orthographic projections of the touch electrodes 10.

It should be noted that, the arrangement position of the touch electrodes 10 in FIG. 6 is only a schematic illustration. In a situation that both the shielding layer 20 and the touch electrodes 10 are disposed at the side of the opposite substrate 02 away from the array substrate 01, the shielding layer 20 and the touch electrodes 10 are in the same layer or in different layers.

In the embodiments of the present disclosure, the shielding layer 20 is at the side of the opposite substrate 02 away from the array substrate 01. On one hand, the process of forming the shielding layer 20 is simplified. On the other hand, in a situation that the shielding layer 20 is above the touch electrodes 10, the shielding layer 20 improves the capacitance uniformity by preventing external signal interference such as a radiating electric field from affecting the touch display panel. In a situation that the shielding layer 20 is located below the touch electrodes 10, the shielding layer 20 improves the capacitance uniformity by preventing internal interference signals caused by the circuit wires at the array substrate 01, the structure arrangement of the touch display panel and the like.

Figure 7A:
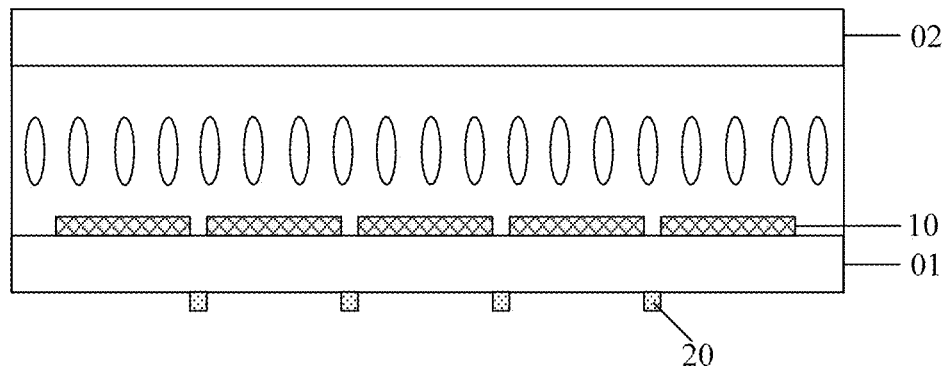
FIG. 7(a) is a fifth schematic cross-sectional view of the touch panel according to the embodiments of the present disclosure.
Figure 7B:
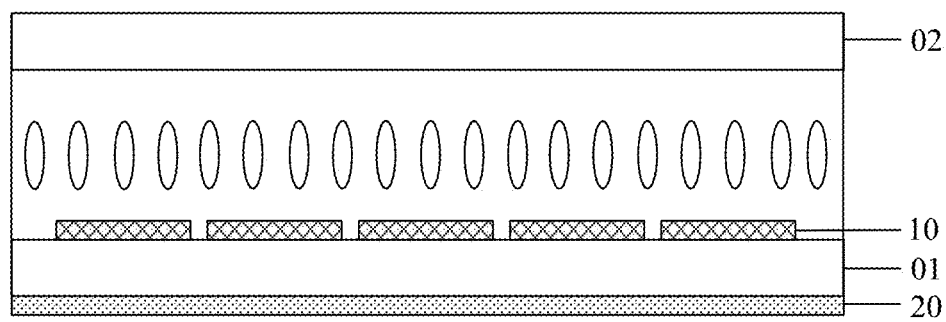
FIG. 7(b) is a sixth schematic cross-sectional view of the touch panel according to the embodiments of the present disclosure.

For example, the shielding layer 20 is at a side, away from the opposite substrate 02, of the array substrate 01. For example, as illustrated in FIG. 7(*a*), an entirety of the orthographic projection of the shielding layer 20 on the base substrate is located in the gap between the orthographic projections of the touch electrodes 10 on the base substrate. Alternatively, as illustrated in FIG. 7(*b*), the shielding layer 20 spreads to cover an entirety of a surface, away from the opposite substrate 02, of the array substrate 01, and in this case, the orthographic projection of the shielding layer 20 overlaps the gap between the orthographic projections of the touch electrodes 10 and the orthographic projections of the touch electrodes 10.

In the embodiments of the present disclosure, the shielding layer 20 is at the side of the array substrate 01 away from the opposite substrate 02. On one hand, the process of forming the shielding layer 20 is simplified. On the other hand, the shielding layer 20 improves the capacitance uniformity by preventing external signal interference such as the radiating electric field from affecting the touch display panel. The shielding layer 20 spreads to cover an entirety of the surface of the array substrate 01 away from the opposite substrate 02, which further simplifies the process.

Figure 8:
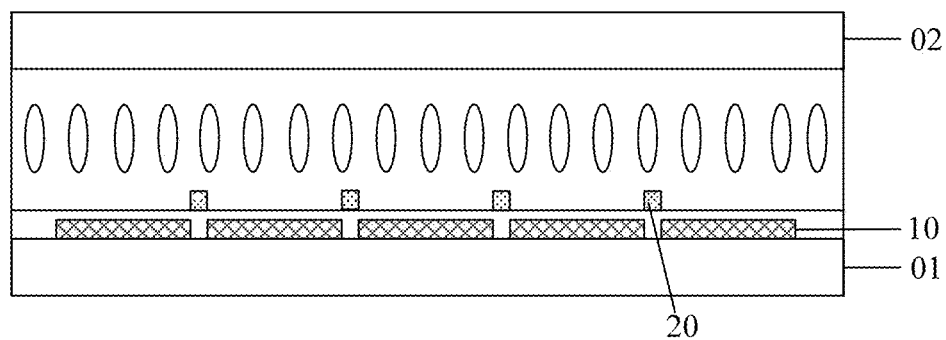
FIG. 8 is a seventh schematic cross-sectional view of the touch panel according to the embodiments of the present disclosure.

For example, as illustrated in FIG. 8, the shielding layer 20 is in the array substrate 01; and the orthographic projection of the shielding layer 20 on the base substrate is located in the gap between the orthographic projections of the touch electrodes 10 on the base substrate. For example, an entirety of the orthographic projection of the shielding layer 20 is located in the gap between the orthographic projections of the touch electrodes 10.

Figure 9:
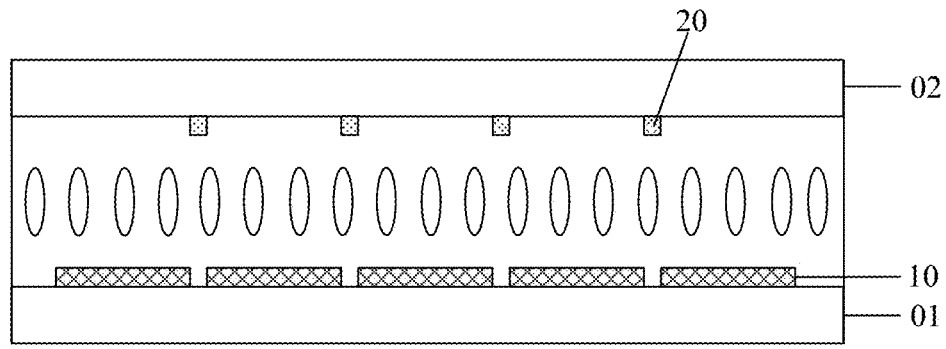
FIG. 9 is an eighth schematic cross-sectional view of the touch panel according to the embodiments of the present disclosure.

Or, for example, as illustrated in FIG. 9, the shielding layer 20 is in the opposite substrate 02; and the orthographic projection of the shielding layer 20 on the base substrate is in the gap between the orthographic projections of the touch electrodes 10 on the base substrate. For example, an entirety of the orthographic projection of the shielding layer 20 is located in the gap between the orthographic projections of the touch electrodes 10.

It should be noted that the arrangement positions of the touch electrodes 10 in FIG. 8 and FIG. 9 are only illustrative examples. In a situation that both the shielding layer 20 and the touch electrodes 10 are disposed in the array substrate 01 or both the shielding layer 20 and the touch electrodes 10 are disposed in the opposite substrate 02, the shielding layer 20 and the touch electrodes 10 are in the same layer or in different layers.

In the embodiments of the present disclosure, the shielding layer 20 is in the array substrate 01 or in the opposite substrate 02, which has the function of preventing the internal interference signals caused by the circuit wires at the array substrate 01, the structure arrangement of the touch display panel and the like, and thus improves the capacitance uniformity of the touch display panel.

Figure 10:
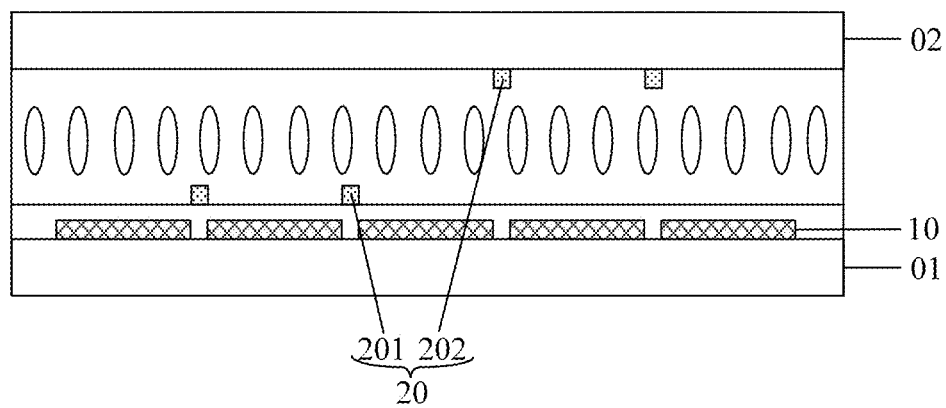
FIG. 10 is a ninth schematic cross-sectional view of the touch panel according to the embodiments of the present disclosure.

For example, as illustrated in FIG. 10, the shielding layer 20 includes a first shielding layer 201 and a second shielding layer 202. The first shielding layer 201 and the second shielding layer 202 are respectively located in the array substrate 01 and the opposite substrate 02.

For example, the first shielding layer 201 and the second shielding layer 202 are electrically connected through a sealant including conductive gold balls or through conductive silver paste.

Figure 12:
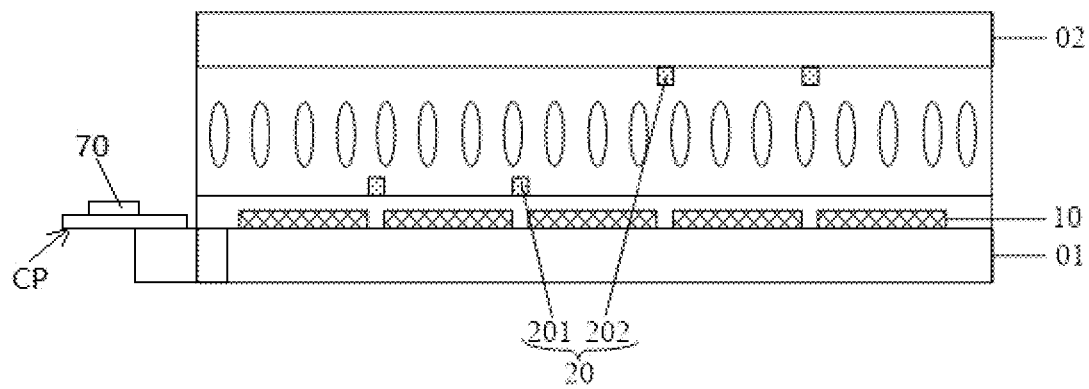
FIG. 12 is a schematic cross-sectional view of a display device according to the embodiments of the present disclosure.

The embodiments of the present disclosure further provide a display device. For example, as illustrated in FIG. 12, the display device includes the touch display panel described above and a circuit board CP. The shielding layer 20 is connected to a control circuit 70 of the circuit board CR The control circuit 70 is configured to: control the shielding layer 20 to be grounded during the display period; and during the touch period, apply a control signal to the shielding layer 20 to prevent an interference signal except the touch signal.

For example, the circuit board CP is a flexible printed circuit (FPC). For example, the circuit board CP is pressbonded into the array substrate 01 through a bonding process.

It should be noted that, in a situation that the arrangement positions of the shielding layer 20 in different embodiments are different, the connection manners between the shielding layer 20 and the control circuit 70 of the circuit board CP in the embodiments are different. For example, the arrangement positions of the shielding layer 20 include the following cases.

Firstly, in the situation that the shielding layer 20 is in the array substrate 01, because the circuit board itself needs to be bonded with the array substrate 01, the shielding layer 20 is connected to the control circuit 70 of the circuit board CP through a wire in the array substrate 01.

Secondly, in the situation that the shielding layer 20 is in the opposite substrate 02, the shielding layer 20 is connected to the control circuit 70 of the circuit board CP through the conductive silver paste.

Thirdly, in the situation that the shielding layer 20 is at the side, away from the array substrate 01, of the opposite substrate 02, the shielding layer 20 is connected to the control circuit 70 of the circuit board CP through a conductive adhesive (for example, a conductive black adhesive) used in a metal housing enclosing the array substrate 01 and the opposite substrate 02, or through the conductive silver paste.

Fourthly, in the situation that the shielding layer 20 is at the side, away from the opposite substrate 02, of the array substrate 01, the shielding layer 20 is connected to the circuit board 70 of the circuit board CP via the conductive adhesive (for example, the conductive black adhesive) used in the metal housing.

Fifthly, in the situation that the first shielding layer 201 and the second shielding layer 202 are respectively located in the array substrate 01 and the opposite substrate 02, the first shielding layer 201 is connected to the control circuit 70 of the circuit board CP through the wire in the array substrate 01, and the second shielding layer 202 is connected to the control circuit 70 of the circuit board CP through the conductive silver paste. The manufacturing process is relatively simple by connecting the first shielding layer 201 to the control circuit 70 of the circuit board CP through the wire in the array substrate 01, and thus it is preferable to connect the first shielding layer 201 to the control circuit 70 of the circuit board CP by using the wire in the array substrate M.

In the display device provided by the embodiments of the present disclosure, by providing the shielding layer 20 in the touch display panel of the display device and arranging the orthographic projection of the shielding layer 20 on the base substrate in the touch display panel to be at least in the gap between the orthographic projections of the touch electrodes 10 on the base substrate according to the position of the shielding layer 20 relative to the touch electrodes 10, the influence of the shielding layer 20 on the touch control function is avoided. On this basis, by connecting the shielding layer 20 to the control circuit of the circuit board and by applying the signal to the shielding layer 20 during the touch period, the shielding layer 20 prevents the internal signal interference caused by circuit wires at the array substrate 01, the structure arrangement of the touch panel and the like, or prevents external signal interference, and thus the capacitance uniformity of the touch display panel is improved to improve the touch accuracy. On this basis, by controlling the shielding layer 20 to be grounded in the display period, the antistatic ability of the touch display panel is also improved.

For example, during the touch period, the control signal that the control circuit CP applies to the shielding layer 20 is identical to the touch signal applied to the touch electrodes 10.

In the embodiments of the present disclosure, in the touch period, the control circuit 70 applies the control signal same as the touch signal to the shielding layer 20, so that the shielding layer 20 has the function of preventing the signal interference to improve the capacitance uniformity of the display device. Therefore, the position of the touch object (for example, the finger) is determined more accurately and the touch performance of the display device is improved.

Figure 13A:
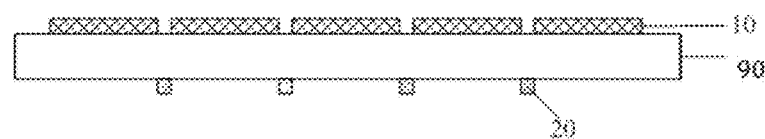
FIG. 13A is a first schematic cross-sectional view of a touch panel according to the embodiments of the present disclosure.
Figure 13B:
FIG. 13B is a second schematic cross-sectional view of the touch panel according to the embodiments of the present disclosure.

At least one embodiment of the present disclosure further provides a touch panel, for example, as illustrated in FIG. 13A and FIG. 13B, the touch panel includes: a base substrate 90; a plurality of block touch electrodes 10 provided on the base substrate 90 and spaced apart from each other, the touch electrodes 10 being self-capacitance electrodes; and a conductive shielding layer 20 on the base substrate 90. The shielding layer 20 is insulated from the touch electrodes 10. An orthographic projection of the shielding layer 20 on the base substrate 90 is at least in a gap between orthographic projections of the touch electrodes 10 on the base substrate 90.

For example, as illustrated in FIG. 13A, the touch electrodes 10 and the shielding layer 20 are respectively located at two sides of the base substrate 90; alternatively, as illustrated in FIG. 13B, the touch electrodes 10 and the shielding layer 20 are located on a same side of the base substrate 90.

In the touch display panel, the display device and the touch panel provided by the embodiments of the present disclosure, by providing the shielding layer and arranging the orthographic projection of the shielding layer on the base substrate to be at least in the gap between the orthographic projections of the touch electrodes on the base substrate according to the position of the shielding layer relative to the touch electrodes, the influence of the shielding layer on the touch control function is avoided. On this basis, by applying the signal to the shielding layer during the touch period, the shielding layer prevents the internal signal interference caused by circuit wires at the array substrate, the structure arrangement of the touch display panel and the like, or prevents external signal interference, and thus the capacitance uniformity of the touch display panel is improved to improve the touch accuracy. On this basis, by controlling the shielding layer to be grounded in the display period, the antistatic ability of the touch display panel is also improved.

What are described above is related to the illustrative embodiments of the disclosure only and not limitative to the scope of the disclosure; the scopes of the disclosure are defined by the accompanying claims.

This application claims the benefit of Chinese Patent Application No. 201621312804.6, filed on Dec. 1, 2016, which is hereby entirely incorporated by reference as a part of the present application.

What is claimed is:

1. A touch display panel, comprising:
   an array substrate and an opposite substrate, each including a base substrate;
   a plurality of block touch electrodes spaced apart from each other on the array substrate, or on the opposite substrate; and
   a conductive shielding layer insulated from the block touch electrodes,
   wherein the conductive shielding layer is at a side, away from the array substrate, of the opposite substrate, or at a side, away from the opposite substrate, of the array substrate and an orthographic projection of the conductive shielding layer on the base substrate is at least in a gap between orthographic projections of the block touch electrodes.

2. The touch display panel according to claim 1, wherein a material of the conductive shielding layer is a transparent conductive material.

3. The touch display panel according to claim 1, wherein
   a material of the conductive shielding layer is an opaque conductive material; and
   the touch display panel further comprises a black matrix, and the orthographic projection of the conductive shielding layer on the base substrate overlaps an orthographic projection of the black matrix on the base substrate.

4. The touch display panel according to claim 1, wherein an entirety of the orthographic projection of the conductive shielding layer on the base substrate is in the gap between the orthographic projections of the block touch electrodes on the base substrate.

5. The touch display panel according to claim 1, wherein an entirety of the orthographic projection of the conductive shielding layer on the base substrate is in the gap between the orthographic projections of the block touch electrodes on the base substrate; or the conductive shielding layer spreads to cover an entirety of a surface, away from the opposite substrate, of the array substrate, or cover an entirety of a surface, away from the array substrate, of the opposite array substrate.

6. The touch display panel according to claim 1, wherein the block touch electrodes are self-capacitance electrodes.

7. The touch display panel according to claim 1, wherein the orthographic projection of the conductive shielding layer on the base substrate partially overlaps the orthographic projections of the block touch electrodes on the base substrate.

8. The touch display panel according to claim 7, wherein a width of a region where the orthographic projection of the conductive shielding layer on the base substrate overlaps the orthographic projections of the block touch electrodes on the base substrate is smaller than 50 micrometers.

9. A display device, comprising a touch display panel, and a circuit board; wherein
   the touch display panel comprises: an array substrate and an opposite substrate, each including a base substrate; a plurality of block touch electrodes spaced apart from each other on the array substrate, or on the opposite substrate; a conductive shielding layer insulated from the block touch electrodes; wherein the conductive shielding layer is at a side, away from the array substrate, of the opposite substrate, or at a side, away from the opposite substrate, of the array substrate; and an orthographic projection of the conductive shielding layer on the base substrate is at least in a gap between orthographic projections of the block touch electrodes;
   the conductive shielding layer is connected with a control circuit of the circuit board; and the control circuit is configured to: control the conductive shielding layer to be grounded during a display period; and apply a control signal to the conductive shielding layer during a touch period, to avoid an interference signal except a touch signal.

10. The display device according to claim 9, wherein in the touch period, the control signal applied by the control circuit to the conductive shielding layer is identical to the touch signal.

11. A touch panel, comprising:
- an array substrate and an opposite substrate, each including a base substrate;
- a plurality of block touch electrodes spaced apart from each other on the array substrate, or on the opposite substrate, wherein the block touch electrodes are self-capacitance electrodes; and
- a conductive shielding layer on the base substrate, wherein the conductive shielding layer is insulated from the block touch electrodes,
- wherein the conductive shielding layer is at a side, away from the array substrate, of the opposite substrate, or at a side, away from the opposite substrate, of the array substrate, and an orthographic projection of the conductive shielding layer on the base substrate is at least in a gap between orthographic projections of the block touch electrodes.

12. The touch display panel according to claim 2, wherein the block touch electrodes are self-capacitance electrodes.

13. The touch display panel according to claim 3, wherein the block touch electrodes are self-capacitance electrodes.

14. The touch display panel according to claim 4, wherein the block touch electrodes are self-capacitance electrodes.

\* \* \* \* \*